United States Patent
Nomura et al.

(10) Patent No.: US 9,683,480 B2
(45) Date of Patent: Jun. 20, 2017

(54) SPARK IGNITION TYPE INTERNAL COMBUSTION ENGINE

(71) Applicant: KABUSHIKI KAISHA TOYOTA CHUO KENKYUSHO, Nagakute-shi, Aichi-ken (JP)

(72) Inventors: Yoshihiro Nomura, Nagakute (JP); Hidemasa Kosaka, Nisshin (JP); Makoto Koike, Toyota (JP); Yoshifumi Wakisaka, Nagoya (JP); Yoshihiro Hotta, Nagoya (JP); Kiyomi Nakakita, Toyota (JP)

(73) Assignee: KABUSHIKI KAISHA TOYOTA CHUO KENKYUSHO, Nagakute-shi (JP)

(*) Notice: Subject to any disclaimer, the term of this patent is extended or adjusted under 35 U.S.C. 154(b) by 20 days.

(21) Appl. No.: 13/847,808

(22) Filed: Mar. 20, 2013

(65) Prior Publication Data
US 2013/0255651 A1  Oct. 3, 2013

(30) Foreign Application Priority Data

Mar. 30, 2012  (JP) .................... 2012-080138

(51) Int. Cl.
*F02B 75/08*  (2006.01)
*F02B 23/00*  (2006.01)
(Continued)

(52) U.S. Cl.
CPC ............. *F02B 23/00* (2013.01); *F02B 77/11* (2013.01); *F02F 1/00* (2013.01); *F02F 1/24* (2013.01);
(Continued)

(58) Field of Classification Search
CPC ........ F02B 77/02; B22D 19/009; F02F 1/004; F02F 3/14
(Continued)

(56) References Cited

U.S. PATENT DOCUMENTS 4,519,359 A * 5/1985 Dworak .................. F02B 77/02
                                                          123/193.5
5,477,820 A  12/1995 Rao
(Continued)

FOREIGN PATENT DOCUMENTS

EP       2 175 116 A1    4/2010
JP       A-01-142246     6/1989
(Continued)

OTHER PUBLICATIONS

Office Action issued in Japanese Application No. 2012-080138 mailed Mar. 11, 2014 (with translation).
(Continued)

*Primary Examiner* — Marguerite McMahon
(74) *Attorney, Agent, or Firm* — Oliff PLC

(57) ABSTRACT

In a spark ignition engine, a thermal insulation thin layer is formed over a wall surface, facing an inside of a combustion chamber, of a base material forming the combustion chamber, and for a thermal conductivity $\lambda$ [W/(m·K)], a thermal diffusivity $\kappa$ [mm$^2$/s], and a thickness L [μm] of the thermal insulation thin layer, $L \geq 16.7 \times \lambda$ and $L \leq 207.4 \times (\kappa)^{0.5}$ are satisfied. With such a configuration, a heat loss Q_total escaping from gas in a cylinder to the wall of the combustion chamber over all strokes can be reduced, and the thermal efficiency can be improved without inducing degradation of knocking due to an increase in an amount of heating Q_intake of the gas in the cylinder during an intake stroke.

5 Claims, 7 Drawing Sheets

(51) Int. Cl.
*F02F 1/00* (2006.01)
*F02F 1/24* (2006.01)
*F02F 3/14* (2006.01)
*F02B 77/11* (2006.01)

(52) U.S. Cl.
CPC ............. *F02F 3/14* (2013.01); *F01L 2101/02* (2013.01); *F02F 2001/008* (2013.01); *F05C 2201/0412* (2013.01); *F05C 2201/0415* (2013.01); *F05C 2203/08* (2013.01); *F05C 2203/0817* (2013.01); *F05C 2203/0843* (2013.01); *F05C 2203/0869* (2013.01); *F05C 2203/0886* (2013.01); *F05C 2203/0895* (2013.01); *F05C 2251/048* (2013.01); *F05C 2253/12* (2013.01); *Y02T 10/125* (2013.01)

(58) Field of Classification Search
USPC ............................................. 123/668, 193, 2
See application file for complete search history.

(56) References Cited

U.S. PATENT DOCUMENTS

| | | |
|---|---|---|
| 6,170,441 B1 | 1/2001 | Haldeman et al. |
| 8,813,734 B2 * | 8/2014 | Kadoshima ............. F02B 77/11 123/193.1 |
| 2003/0051713 A1 * | 3/2003 | Bedwell et al. ............... 123/668 |
| 2007/0084449 A1 * | 4/2007 | Najt et al. ..................... 123/668 |
| 2012/0042859 A1 | 2/2012 | Sakai |
| 2016/0025035 A1 * | 1/2016 | Kadoshima ............. C23C 18/12 252/62 |

FOREIGN PATENT DOCUMENTS

| | | |
|---|---|---|
| JP | A-08-100659 | 4/1996 |
| JP | A-2002-519566 | 7/2002 |
| JP | A-2009-243352 | 10/2009 |
| JP | 2010-249008 A | 11/2010 |
| WO | WO 00/00725 | 1/2000 |
| WO | WO 2009/020206 A1 | 2/2009 |

OTHER PUBLICATIONS

Oct. 21, 2014 Office Action issued in Japanese Application No. 2012-080138.

* cited by examiner

| λ W/mK | | | | | | |
|---|---|---|---|---|---|---|
| 1.5 | | | UPPER LIMIT THICKNESS Lmax<br>OPTIMUM THICKNESS Lopt<br>LOWER LIMIT THICKNESS Lmin | 207.4<br>122<br>25 | 416.5<br>245<br>25 | |
| 0.75 | | | 103.7<br>61<br>12.5 | 207.4<br>122<br>12.5 | 416.5<br>245<br>12.5 | |
| 0.1875 | | 52.7<br>31<br>3.125 | 103.7<br>61<br>3.125 | 207.4<br>122<br>3.125 | 416.5<br>245<br>3.125 | |
| 0.0469 | 25.5<br>15<br>0.7813 | 52.7<br>31<br>0.7813 | 103.7<br>61<br>0.7813 | 207.4<br>122<br>0.7813 | | |
| κ mm²/s | 0.0156 | 0.0625 | 0.25 | 1 | 4 | |

FIG. 8

| λ W/mK | | | | | | |
|---|---|---|---|---|---|---|
| 1.5 | | | UPPER LIMIT THICKNESS Lmax<br>OPTIMUM THICKNESS Lopt<br>LOWER LIMIT THICKNESS Lmin | 146.4<br>122<br>25 | 294<br>245<br>25 | |
| 0.75 | | | 73.2<br>61<br>12.5 | 146.4<br>122<br>12.5 | 294<br>245<br>12.5 | |
| 0.1875 | | 37.2<br>31<br>3.125 | 73.2<br>61<br>3.125 | 146.4<br>122<br>3.125 | 294<br>245<br>3.125 | |
| 0.0469 | 18<br>15<br>0.7813 | 37.2<br>31<br>0.7813 | 73.2<br>61<br>0.7813 | 146.4<br>122<br>0.7813 | | |
| κ mm²/s | 0.0156 | 0.0625 | 0.25 | 1 | 4 | |

FIG. 9

SPARK IGNITION TYPE INTERNAL COMBUSTION ENGINE

PRIORITY INFORMATION

This application claims priority to Japanese Patent Application No. 2012-080138, filed on Mar. 30, 2012, which is incorporated herein by reference in its entirety.

BACKGROUND

Technical Field

The present invention relates to a spark ignition engine, and in particular to a spark ignition engine in which a thermal insulation layer is formed on a wall surface, facing an inside of a combustion chamber, of at least a part of base materials forming the combustion chamber of the internal combustion engine.

Related Art

In order to improve thermal efficiency of an internal combustion engine, a technique has been proposed in which a thermal insulation layer is formed on a wall surface, facing an inside of a combustion chamber, of at least a part of base materials forming the combustion chamber of the internal combustion engine (for example, refer to JP 1-142246 A). In JP 1-142246 A, for example, a thermal insulation layer made of ceramic with a base material of, for example, zirconia is formed on a surface of components of the combustion chamber such as a valve face, a cylinder head surface, a cylinder wall, and a piston top surface, to a thickness in a range of 50 μm-220 μm. With this configuration, an amount of transfer of heat from the gas in the combustion chamber to the components of the combustion chamber is reduced, and the thermal efficiency is improved.

A heat loss Qloss [W] in the cylinder of the internal combustion engine can be represented by the following equation (1), with a heat transfer coefficient h [W/(m²·K)] depending on a pressure in the cylinder and the gas flow, a surface area A [m²] in the cylinder, a gas temperature Tg [K] in the cylinder, and the temperature of the wall Twall [K] facing the inside of the cylinder (that is, contacting the gas in the cylinder):

$$Qloss = A \times h \times (Tg - Twall) \quad (1)$$

During the cycles of the internal combustion engine, the gas temperature Tg in the cylinder changes with time, but by changing the wall temperature Twall with time so as to follow the gas temperature Tg in the cylinder, the value of (Tg−Twall) in equation (1) can be set small, and the heat loss Qloss can be reduced.

When the thermal insulation layer is formed on a wall surface facing the inside of the combustion chamber of the internal combustion engine, if the thickness of the thermal insulation layer is increased, the amount of transfer of heat from the gas in the combustion chamber to the components of the combustion chamber can be reduced, and consequently, the thermal efficiency of the internal combustion engine can be improved. However, when the thickness of the thermal insulation layer is increased too much, the temperature of the wall of the combustion chamber which has increased during the combustion stroke is not sufficiently reduced during the expansion and exhaust strokes, and would be at a higher temperature at the start of the intake stroke in the next cycle compared to the configuration without the thermal insulation layer, resulting in an increased amount of heat being transferred from the wall of the combustion chamber to the gas in the cylinder during the intake stroke, and an increased amount of heating of the gas in the cylinder. Thus, in a spark ignition engine, if the thickness of the thermal insulation layer is thickened too much, the amount of heating of the gas in the cylinder during the intake stroke is increased, the gas temperature at a compression end is increased, and knocking tends to occur more frequently.

JP 1-142246 A only discloses a range of the thickness of the thermal insulation layer (50 μm-220 μm), and does not consider is the change in the amount of heat transferred from the combustion chamber wall to the gas in the cylinder during the intake stroke depending on thermal properties of the thermal insulation layer, such as the thermal diffusivity. Thus, depending on the material of the thermal insulation layer, the amount of heating of the gas in the cylinder during the intake stroke may increase, and knocking may occur more frequently.

An advantage of the present invention is provision of a spark ignition engine in which the thermal efficiency is improved without worsening the knocking.

SUMMARY

According to one aspect of the present invention, there is provided a spark ignition engine in which a thermal insulation layer is formed over a wall surface, facing an inside of a combustion chamber, of at least a part of base materials forming the combustion chamber, and mixture gas in the combustion chamber is ignited to burn the mixture gas, wherein, for a thermal conductivity λ [W/(m·K)], a thermal diffusivity κ [mm²/s], and a thickness L [μm] of the thermal insulation layer, a relationship:

$$16.7 \times \lambda \leq L \leq 207.4 \times (\kappa)^{0.5}$$

is satisfied.

According to another aspect of the present invention, there is provided a spark ignition engine in which a thermal insulation layer is formed over a wall surface, facing an inside of a combustion chamber, of at least a part of base materials forming the combustion chamber, and mixture gas in the combustion chamber is ignited to burn the mixture gas, wherein a thickness of the thermal insulation layer is set within a range of greater than or equal to a lower limit thickness and less than or equal to an upper limit thickness, the lower limit thickness being a thickness where an accumulated amount of heat transferred from gas in a cylinder to the wall of the combustion chamber over all strokes is reduced by 2% compared to a configuration in which there is no thermal insulation layer, and the upper limit thickness being a thickness where an amount of heat transferred from the wall of the combustion chamber to the gas in the cylinder in an intake stroke is increased by 10% compared to the configuration in which there is no thermal insulation layer.

According to another aspect of the present invention, preferably, in the spark ignition engine, a relationship:

$$16.7 \times \lambda \leq L \leq 146.4 \times (\kappa)^{0.5}$$

is satisfied.

According to another aspect of the present invention, preferably, in the spark ignition engine, the thickness of the thermal insulation layer is set within a range of greater than or equal to a lower limit thickness and less than or equal to an upper limit thickness, the lower limit thickness being a thickness where the accumulated amount of heat transferred from the gas in the cylinder to the wall of the combustion chamber over all strokes is reduced by 2% compared to the configuration in which there is no thermal insulation layer, and the upper limit thickness being a thickness where the amount of the heat transferred from the wall of the combustion chamber to the gas in the cylinder in the intake stroke is equal to that in the configuration in which there is no thermal insulation layer.

According to another aspect of the present invention, preferably, in the spark ignition engine, a relationship:

$$L=122\times(\kappa)^{0.5}$$

is satisfied.

According to another aspect of the present invention, there is provided a spark ignition engine in which a plurality of thermal insulation layers having different thermal diffusivities from each other are formed over wall surfaces, facing an inside of a combustion chamber, of at least apart of base materials forming the combustion chamber, and mixture gas in the combustion chamber is ignited to burn the mixture gas, wherein thicknesses of the thermal insulation layers are set such that a thermal insulation layer of a higher thermal diffusivity has a higher thickness.

According to another aspect of the present invention, preferably, in the spark ignition engine, for a thermal diffusivity $\kappa$ and a thickness L of the thermal insulation layer, the thicknesses L of the thermal insulation layers are set such that $L/(\kappa)^{0.5}$ is approximately constant.

According to various aspects of the present invention, in a spark ignition engine, the heat loss escaping from the gas in the cylinder to the combustion chamber wall accumulated over all strokes can be reduced without worsening the knocking due to an increase in an amount of heating of the gas in the cylinder during the intake stroke, and consequently, the thermal efficiency can be improved.

BRIEF DESCRIPTION OF THE DRAWINGS

Preferred embodiment(s) of the present invention will be described in detail based on the following figures, wherein:

FIG. 8 is a diagram showing an example calculation result of an upper limit thickness Lmax, an optimum thickness Lopt, and a lower limit thickness Lmin of a thin layer for thermal insulation;

FIG. 9 is a diagram showing another example calculation result of the upper limit thickness Lmax, the optimum thickness Lopt, and the lower limit thickness Lmin of the thin layer for thermal insulation;

DETAILED DESCRIPTION

A preferred embodiment of the present invention will now be described with reference to the drawings.

Figure 1:
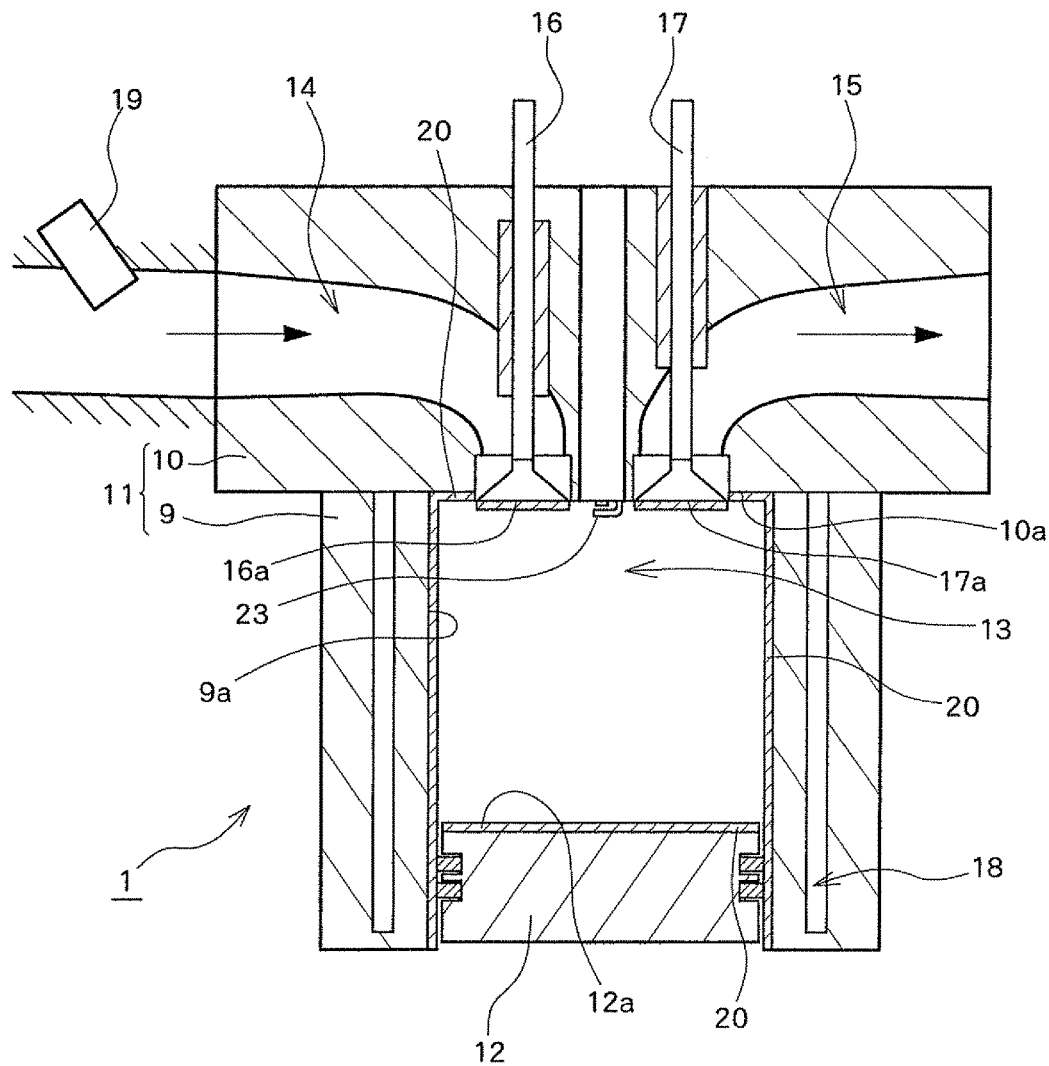
FIG. 1 is a diagram schematically showing a structure of a spark ignition engine according to a preferred embodiment of the present invention.

FIG. 1 is a diagram schematically showing a structure of a spark ignition engine 1 according to a preferred embodiment of the present invention, and schematically showing an internal structure viewed from a direction perpendicular to an axial direction of a cylinder 11. The spark ignition engine 1 according to the present embodiment is formed by, for example, a gasoline engine, and mixture gas in a combustion chamber 13 is spark-ignited by an ignition plug 23, to achieve flame-propagated combustion.

The internal combustion engine (for example, a gasoline engine) 1 comprises a cylinder block 9 and a cylinder head 10, and the cylinder block 9 and the cylinder head 10 form the cylinder 11. A piston 12 which reciprocates in the axial direction of the cylinder 11 is housed in the cylinder 11. A space surrounded by a top surface 12a of the piston 12, an inner wall surface 9a of the cylinder block 9, and a lower surface 10a of the cylinder head forms a combustion chamber 13. An intake port 14 in communication with the combustion chamber 13 and an exhaust port 15 in communication with the combustion chamber 13 are formed on the cylinder head 10. In addition, an intake valve 16 which opens and closes a boundary between the intake port 14 and the combustion chamber 13, and an exhaust valve 17 which opens and closes a boundary between the exhaust port 15 and the combustion chamber 13 are provided. A fuel injector 19 is provided on the intake port 14, fuel (for example, hydrocarbon-based fuel such as gasoline) is injected from the fuel injector 19 into the intake port 14, and, in an intake stroke, mixture gas of the fuel and the air is introduced into the cylinder 11. The ignition plug 23 is placed on the cylinder head 10 such that the spark discharge part of the ignition plug 23 faces an approximate center portion in the combustion chamber 13. The mixture gas in the combustion chamber 13 is ignited by spark discharge of the ignition plug 23 at an ignition timing, so that the mixture gas in the combustion chamber 13 is combusted by flame propagation. The gas in the combustion chamber 13 is exhausted to the exhaust port 15 in an exhaust stroke. A cooling water jacket 18 is formed on the cylinder block 9, and the internal combustion engine 1 is cooled by supplying cooling water to the cooling water jacket 18.

In the present embodiment, a thermal insulation thin layer 20 for decreasing the heat transfer from the gas in the combustion chamber 13 to the base material is formed on a wall surface facing (fronting) the inside of the combustion chamber 13 of at least a part of the base materials forming the combustion chamber 13. Here, as the base materials forming the combustion chamber 13, the cylinder block (cylinder liner) 9, the cylinder head 10, the piston 12, the intake valve 16, and the exhaust valve 17 may be exemplified. As the wall surface facing the combustion chamber 13, one or more of an inner wall 9a of the cylinder block (inner wall of the cylinder liner), a lower surface 10a of the cylinder head, a piston top surface 12a, a bottom surface 16a of the intake valve (bottom surface of umbrella portion), and a bottom surface 17a of the exhaust valve (bottom surface of umbrella portion) may be exemplified. In FIG. 1, an example configuration is shown in which the thermal insulation layer 20 is formed on each of the inner wall 9a of the cylinder block, the lower surface 10a of the cylinder head, the piston top surface 12a, the bottom surface 16a of the intake valve, and the bottom surface 17a of the exhaust valve. However, it is not absolutely necessary to form the thermal insulation thin layer 20 on all of the inner wall 9a of the cylinder block, the lower surface 10a of the cylinder head, the piston top surface 12a, the bottom surface 16a of the intake valve, and the bottom surface 17a of the exhaust valve. In other words, the thermal insulation thin layer 20 may be formed on one or more of the inner surface 9a of the cylinder block, the lower surface 10a of the cylinder head, the piston top surface 12a, the bottom surface 16a of the intake valve, and the bottom surface 17a of the exhaust valve.

As described above, in the cycles of the internal combustion engine, the gas temperature Tg in the cylinder changes with time. However, by changing the wall temperature Twall of the combustion chamber to follow the gas temperature Tg in the cylinder with the thermal insulation thin layer 20, the value of (Tg−Twall) in equation (1) can be set small, and the heat loss Qloss in the cylinder can be reduced. As a result, the thermal efficiency of the internal combustion engine can be improved and the fuel consumption can be improved. In this process, preferably, a fluctuation range (swing range) of the wall temperature Twall of the combustion chamber in one cycle is increased while inhibiting an increase in the wall temperature Twall of the combustion chamber during the intake stroke. In order to do this, thermal conductivity and a thermal capacity per unit volume of the thermal insulation thin layer 20 are preferably reduced.

Figure 2:
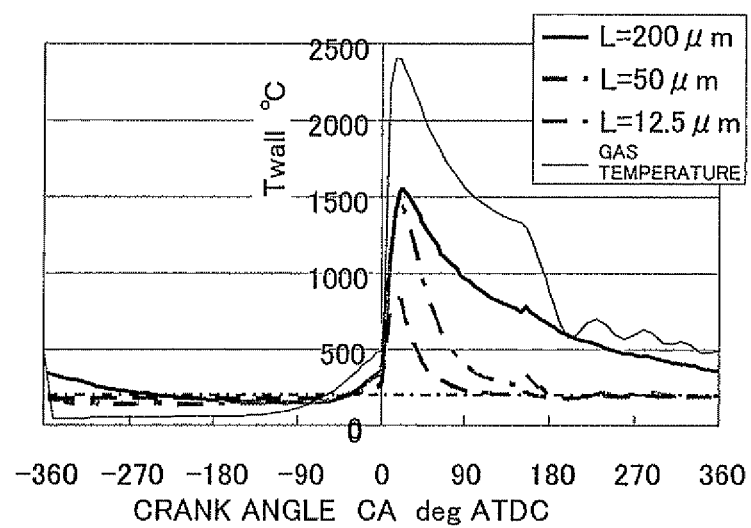
FIG. 2 is a diagram showing an example of a history of a wall temperature Twall of the combustion chamber with respect to a crank angle.

Here, when the thermal conductivity of the thermal insulation thin layer 20 is λ, the thickness of the thermal insulation thin layer is L, and a temperature difference between the surface of the thermal insulation thin layer 20 and an interface between the thermal insulation thin layer 20 and the base material is ΔT, the amount of heat Q transferred from the thermal insulation thin layer 20 to the base material is proportional to λ/L×ΔT. In addition, a history of the wall temperature Twall of the combustion chamber with respect to the crank angle (having a compression top dead center of 0°) is such that, for example, the wall temperature increases at the end of compression and during the combustion stroke and decreases during the expansion and exhaust strokes, and the history is repeated for the next intake and compression strokes, as shown in FIG. 2. FIG. 2 shows a result of a calculation of the history of the wall temperature Twall of the combustion chamber under conditions of the thickness L of the thermal insulation thin layer 20 being 12.5 μm, 50 μm, and 200 μm. When the thickness L of the thermal insulation thin layer 20 is increased, for example, from 12.5 μm to 50 μm, as shown in FIG. 2, the swing range of the wall temperature Twall of the combustion chamber in one cycle is increased. Therefore, when the thickness L of the thermal insulation thin layer 20 is increased, a thermal resistance λ/L is reduced and the amount of heat Q from the thermal insulation thin layer 20 to the base material is reduced. In addition, when the thickness L of the thermal insulation thin layer 20 is increased, the thermal capacity of the thermal insulation thin layer 20 is also increased. As a result, as shown in FIG. 2, when the thickness L of the thermal insulation thin layer 20 is increased to 200 μm, the wall temperature Twall of the combustion chamber which has increased during the combustion stroke is not sufficiently reduced during the expansion and exhaust strokes, and becomes higher at the start of the intake stroke of the next cycle. When the wall temperature Twall of the combustion chamber at the start of the intake stroke becomes high, the amount of heat transferred from the wall of the combustion chamber to the gas in the cylinder during the intake stroke is increased and the amount of heating of the gas in the cylinder is increased. When the amount of heating of the gas in the cylinder during the intake stroke is increased, the charging efficiency is reduced and the output power tends to be reduced. In addition, because the heat loss from the compressed gas to the wall of the combustion chamber is reduced, the gas temperature at the compression end is increased, resulting in a higher likelihood of occurrence of knocking.

Figure 3:
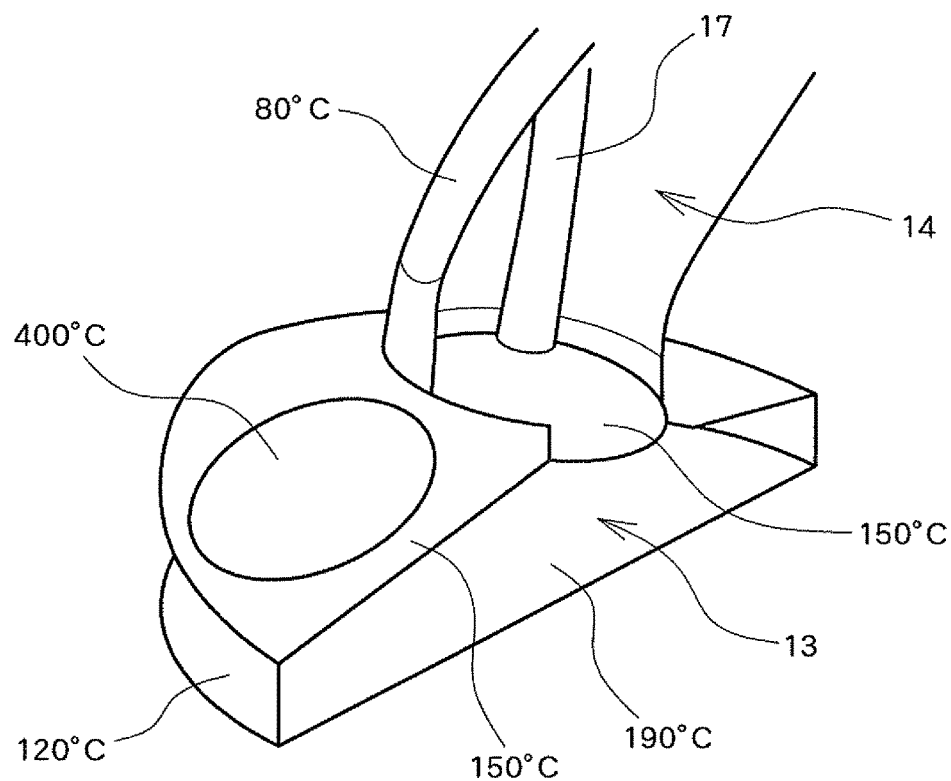
FIG. 3 is a diagram showing an example of a boundary condition of a 3D-CFD for a spark ignition engine.
Figure 4:
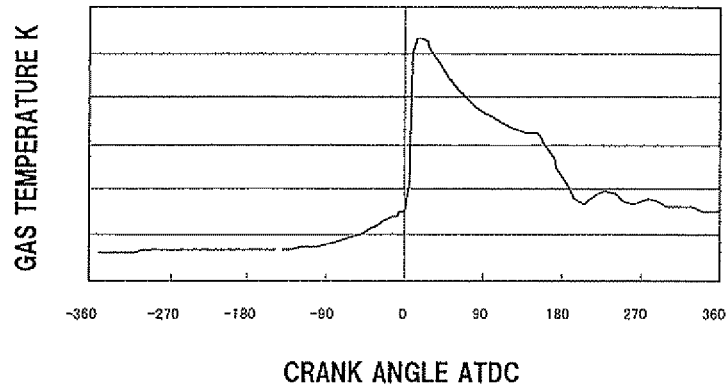
FIG. 4 is a diagram showing an example of temporal history of an average gas temperature in a cylinder calculated by the 3D-CFD.
Figure 5:
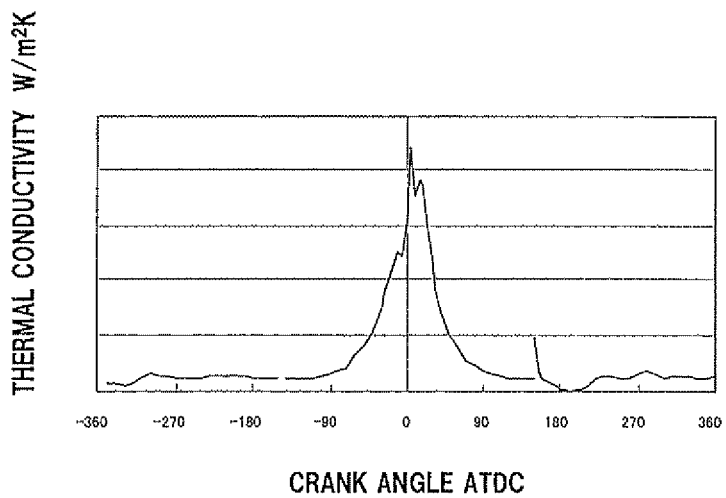
FIG. 5 is a diagram showing an example of temporal history of an average heat transfer coefficient of a wall of a combustion chamber calculated by the 3D-CFD.

The present inventor has calculated an "amount of heat transferred from the wall of the combustion chamber to the gas in the cylinder during the intake stroke" and an "accumulated amount of heat transferred from the gas in the cylinder to the wall of the combustion chamber during all of the intake, compression, combustion, and exhaust strokes", while changing the conditions of the thermal conductivity λ, thermal diffusivity κ, and the thickness L of the thermal insulation thin layer 20. In the calculation, first, a 3D-CFD of the spark ignition engine was executed, to calculate a "temporal history of an average gas temperature in the cylinder" and a "temporal history of an average heat transfer coefficient of the wall of the combustion chamber". In the 3D-CFD, the combustion chamber 13 of the spark ignition engine (refer to FIG. 3), and the intake port 14 (refer to FIG. 3) and the exhaust port (not shown) for executing gas exchange were set as calculation targets, an axial symmetry of the combustion chamber 13 and the portions of the intake port 14 and the exhaust port was assumed, and a computational mesh as shown in FIG. 3 was created (the exhaust port is not shown). For the boundary condition, the wall temperature of the combustion chamber was assumed to be a constant temperature, for example, as shown in FIG. 3. Based on these conditions, combustion calculations in the combustion chamber 13 were executed for each crank angle. As the software for use in the calculation, a commercially available CFD software such as, for example, STAR-CD (registered trademark) may be used. FIGS. 4 and 5 show examples of the "temporal history of average gas temperature in the cylinder [K]" and "temporal history of the average heat transfer coefficient of the wall of the combustion chamber [W/(m$^2$·K)]" at representation points calculated by the 3D-CFD. In FIGS. 4 and 5, the crank angle is set such that the compression top dead center is at 0°.

Figure 7:
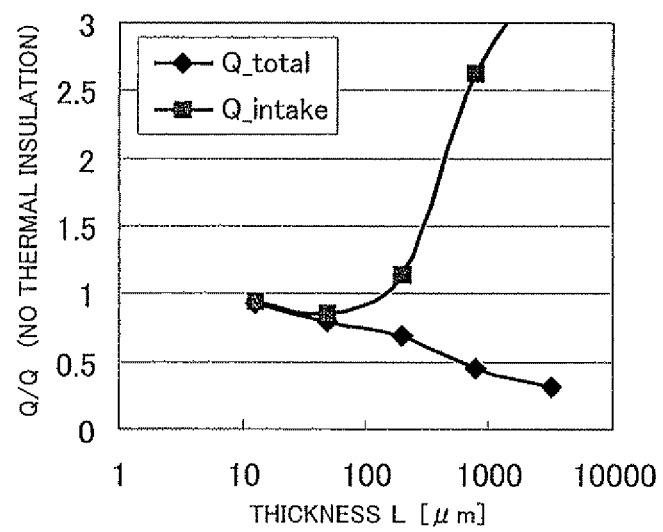
FIG. 7 is a diagram showing an example of an amount of heat Q_intake transferred from the combustion chamber wall to the gas in the cylinder during an intake stroke and an example of an amount of heat Q_total transferred from the gas in the cylinder to the combustion chamber wall, accumulated over all strokes, which are calculated by the one-dimensional thermal conduction analysis.
Figure 6:
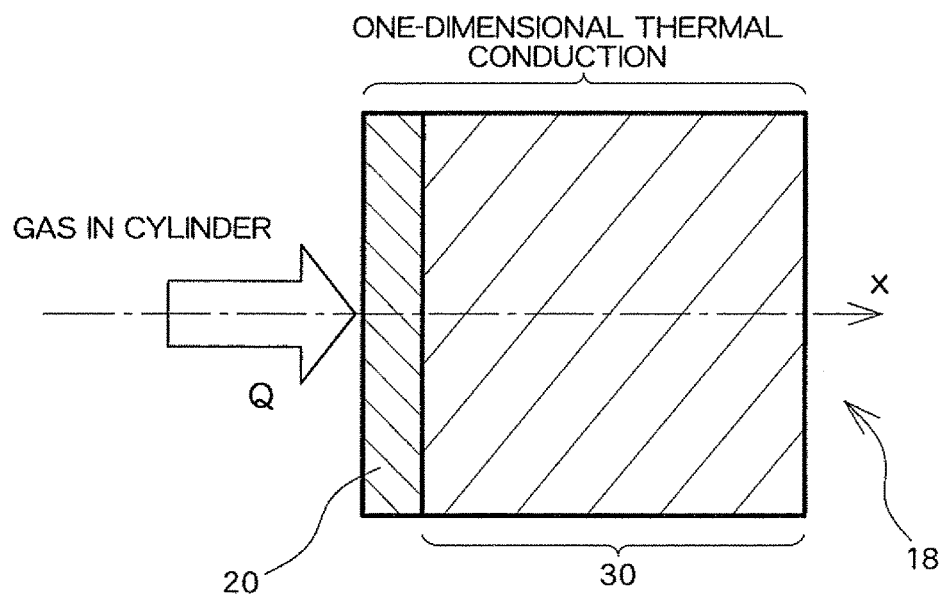
FIG. 6 is a diagram for explaining a calculation target of a one-dimensional thermal conduction analysis.

Then, for an infinite flat plane simulating the wall of the combustion chamber and the thermal insulation thin layer 20 formed thereon, a one-dimensional thermal conduction analysis in the vertical direction to the thermal insulation thin layer 20 was executed, to calculate the "amount of heat transferred from the wall of the combustion chamber to the gas in the cylinder during the intake stroke" and the "accumulated amount of heat transferred from the gas in the cylinder to the wall of the combustion chamber over all of the intake, compression, combustion, and exhaust strokes". In the one-dimensional thermal conduction analysis, a base material 30 (for example, an aluminum alloy) as shown in FIG. 6 and the thermal insulation thin layer 20 were set as the calculation targets, the thermal properties (thermal conductivity λ, density ρ, specific heat C, and thermal diffusivity κ) and the is thickness L of the thermal insulation thin layer 20 were changed as calculation parameters, the "temporal history of the average gas temperature in the cylinder" and the "temporal history of the average heat transfer coefficient of the wall of the combustion chamber" calculated by the 3D-CFD were set as the boundary conditions to be input for an inflow heat Q from the gas in the cylinder, a representative point (for example, 2000 rpm) of a low revolution speed at which knocking tends to occur more frequently was used as the revolution speed of the engine, and a condition of full loads was employed. FIG. 7 shows examples of the "amount of heat Q_intake transferred from the wall of the combustion chamber to the gas in the cylinder during the intake stroke" and the "amount of heat Q_total transferred from the gas in the cylinder to the wall of the combustion chamber over all of the intake, compression, combustion, and exhaust strokes" calculated by the one-dimensional thermal conduction analysis based on these conditions. In FIG. 7, characteristics of the amounts of heat Q_intake and Q_total are calculated while the thermal conductivity λ of the thermal insulation thin layer 20 is fixed at 0.1875 [W/(m·K)] and the thermal diffusivity κ of the thermal insulation thin layer 20 is fixed at 1.0 [mm$^2$/s], and the thickness L [μm] of the thermal insulation thin layer 20 is changed. The values on the vertical axis in FIG. 7 representing the amounts of heat Q_intake and Q_total are normalized by dividing the amount of heat transferred when there is the thermal insulation thin layer 20 by the amount of heat transferred when there is no thermal insulation thin layer 20 (that is, no thermal insulation) With regard to thermal conductivity λ, density ρ, specific heat C, and thermal diffusivity κ which are thermal properties of the thermal insulation thin layer 20, an equation, $\lambda = \rho \times C \times \kappa$ holds true, and when three of these four parameters are determined, the remaining parameter is automatically determined.

As shown in FIG. 7, the "accumulated amount of heat Q_total transferred from the gas in the cylinder to the wall of the combustion chamber over all of the intake, compression, combustion, and exhaust strokes" is less than 1 (less than the case where there is no thermal insulation thin layer 20), and furthermore, is reduced as the thickness L of the thermal insulation thin layer 20 is increased. In other words, when the thermal insulation thin layer 20 is present, compared to a structure without the thermal insulation thin layer 20, the heat loss Q_total escaping from the gas in the cylinder to the wall of the combustion chamber over all strokes is reduced, and, as the thickness L of the thermal insulation thin layer 20 is increased, the reduction advantage of the heat loss Q_total escaping from the gas in the cylinder to the wall of the combustion chamber over all strokes is improved. On the other hand, the "amount of heat Q_intake transferred from the wall of the combustion chamber to the gas in the cylinder during the intake stroke" becomes smaller than 1 (becomes smaller than the case where there is no thermal insulation thin layer 20) with an increase in the thickness L of the thermal insulation thin layer 20, and is reduced until a certain thickness, but is increased beyond the certain thickness. When the thickness L is further increased, Q_intake becomes greater than 1 (becomes greater than the case where there is no thermal insulation thin layer 20). That is, with the increase of the thickness L of the thermal insulation thin layer 20, the amount of heating Q_intake of the gas in the cylinder during the intake stroke becomes smaller than the case where there is no thermal insulation thin layer 20, is reduced until a certain thickness, is increased beyond the certain thickness, and becomes greater than the case where there is no thermal insulation thin layer 20 when the thickness L is further increased. The inhibition advantage of knocking is improved as the amount of heat Q_intake of the gas in the cylinder during the intake stroke is reduced.

Based on the calculation result shown in FIG. 7, it can be understood that there is a range of the thickness L of the thermal insulation thin layer 20 in which the amount of heating Q_intake of the gas in the cylinder during the intake stroke can be reduced (knocking can be inhibited) while reducing the heat loss Q_total escaping from the gas in the cylinder to the wall of the combustion chamber over all strokes, compared to the case where there is no thermal insulation thin layer 20, and that there is a thickness L of the thermal insulation thin layer 20 where the amount of heating Q_intake of the gas in the cylinder during the intake stroke is minimized (inhibition advantage of knocking is maximized). In addition, as a result of calculation of the characteristics of Q_total and Q_intake with respect to the thickness L of the thermal insulation thin layer 20 while changing the thermal conductivity λ and the thermal diffusivity κ of the thermal insulation thin layer 20, a calculation result showing a similar tendency was obtained. In the present embodiment, the thickness L of the thermal insulation thin layer 20 is set such that the heat loss Q_total escaping from the gas in the cylinder to the wall of the combustion chamber over all strokes is reduced and knocking does not tend to occur compared to the case where there is no thermal insulation thin layer 20. Further, preferably, the thickness L of the thermal insulation thin layer 20 is set such that the amount of heating Q_intake of the gas in the cylinder during the intake stroke is minimized (the inhibition advantage of knocking is maximized).

It should be noted that the factor which influences the knocking is the temperature of the compressed gas at the ignition timing. If the increase in the gas temperature at the ignition timing is within 10° C. compared to the case where there is no thermal insulation thin layer 20, the degradation of knocking can be ignored. When the increase in the gas temperature at the compression end is to be inhibited to a value within 10° C., the amount of heating Q_intake of the gas in the cylinder during the intake stroke can be allowed to be an increase of 10% compared to the case where there is no thermal insulation thin layer 20. Thus, a thickness L of the thermal insulation thin layer 20 where the Q_intake (insulation)/Q_intake (no insulation) becomes 1.1, that is, where the amount of heat Q_intake transferred from the wall of the combustion chamber to the gas in the cylinder during the intake stroke is increased by 10% compared to the case where there is no thermal insulation thin layer 20, is set as an upper limit thickness Lmax of the thermal insulation thin layer 20. On the other hand, a significant thermal efficiency improvement advantage is can be obtained when the heat loss Q_total escaping from the gas in the cylinder to the wall of the combustion chamber over all strokes is lower by 2% or more compared to the case where there is no thermal insulation thin layer 20. Thus, a thickness L of the thermal insulation thin layer 20 where Q_total (insulation)/Q_total (no insulation) becomes 0.98, that is, where the accumulated amount of heat Q_total transferred from the gas in the cylinder to the wall of the combustion chamber over all strokes is reduced by 2% compared to the case where there is no thermal insulation thin layer 20, is set as a lower limit thickness Lmin of the thermal insulation thin layer 20. Further, a thickness L of the thermal insulation thin layer 20 where Q_intake is minimized is set as an optimum thickness Lopt of the thermal insulation thin layer 20. In the calculation result of FIG. 7 where the thermal conductivity λ of the thermal insulation thin layer 20 is 0.1875 [W/(m·K)] and the thermal diffusivity κ of the thermal insulation thin layer 20 is 1.0 [mm²/s], the upper limit thickness Lmax of the thermal insulation thin layer 20 where Q_intake (insulation)/Q_intake (no insulation)=1.1 is 207.4 [μm], the lower limit thickness Lmin of the thermal insulation thin layer 20 where Q_total (insulation)/Q_total (no insulation)=0.98 is 3.125 [μm], and thus, the thickness L [μm] of the thermal insulation thin layer 20 is set within a range of 3.125≤L≤207.4. In addition, because the optimum thickness Lopt of the thermal insulation thin layer 20 where Q_intake is minimized is 122 [μm], the thickness L [μm] of the thermal insulation thin layer 20 is preferably set to 122 [μm].

Further, characteristics of Q_total and Q_intake with respect to the thickness L of the thermal insulation thin layer 20 were calculated similar to FIG. 7 while changing the thermal conductivity λ and the thermal diffusivity κ of the thermal insulation thin layer 20, and FIG. 8 shows a result of the calculation of the upper limit thickness Lmax [μm] of the thermal insulation thin layer 20 where Q_intake (insulation)/Q_intake (no insulation)=1.1, the optimum thickness Lopt [μm] of the thermal insulation thin layer 20 where Q_intake is minimized, and the lower limit thickness Lmin [μm] of the thermal insulation thin layer 20 where Q_total (insulation)/Q_total (no insulation)=0.98. In FIG. 8, for given thermal conductivity λ and thermal diffusivity κ, a value at the upper column represents the upper limit thickness Lmax, the value at the middle column represents the optimum thickness Lopt, and the value at the lower column represents the lower limit thickness Lmin. For example, for λ=1.5 [W/(m·K)] and κ=1 [mm²/s], Lmax=207.4 [μm], Lopt=122 [μm], and Lmin=25 [μm]. As described before, in order to increase the swing range of the wall temperature Twall of the combustion chamber in one cycle while inhibiting the increase in the wall temperature Twall of the combustion chamber during the intake stroke, the thermal conductivity λ and the thermal capacity μC per unit volume of the thermal insulation thin layer 20 are preferably small. Therefore, in the calculation result shown in FIG. 8, the upper limit thickness Lmax [μm], the optimum thickness Lopt [μm], and the lower limit thickness Lmin [μm] are calculated within a range where the thermal conductivity λ of the thermal insulation thin layer 20 is less than or equal to 1.5 [W/(m·K)] and the thermal capacity ρC per unit volume of the thermal insulation thin layer 20 is less than or equal to 3000 [kJ/(m³·K)].

In the calculation result shown in FIG. 8, the optimum thickness Lopt of the thermal insulation thin layer 20 changes corresponding to the thermal diffusivity κ of the thermal insulation thin layer 20, and the optimum thickness Lopt is reduced as the thermal diffusivity κ is reduced. Similarly, the upper limit thickness Lmax of the thermal insulation thin layer 20 also changes corresponding to the thermal diffusivity κ of the thermal insulation thin layer 20, and the upper limit thickness Lmax is reduced as the thermal diffusivity κ is reduced. The amount of heating Q_intake of the gas in the cylinder during the intake stroke is affected by how easy the thermal insulation thin layer 20 accumulates heat, and when the thermal capacity (volume specific heat) ρC per unit volume of the thermal insulation thin layer 20 is large, the heat tends to be easily accumulated in the thermal insulation thin layer 20. When, on the other hand, the thermal diffusivity κ of the thermal insulation thin layer 20 is large, the heat in the thermal insulation thin layer 20 can be more easily transferred to the base material. The amount of heating Q_intake changes by the balance of these parameters, and the optimum thickness Lopt of the thermal insulation thin layer 20 where Q_intake is minimized and the upper limit thickness Lmax of the thermal insulation thin layer 20 where Q_intake (insulation)/Q_intake (no insulation)=1.1 consequently change. In other words, the optimum thickness Lopt and the upper limit thickness Lmax is reduced for a larger volume specific heat ρC and lower thermal diffusivity κ. When the volume specific heat ρC of the thermal insulation thin layer 20 is equal, if the thermal diffusivity κ is larger, the heat tends to more easily escape to the base material at the backside, and thus the optimum thickness Lopt and the upper limit thickness Lmax are increased. On the other hand, if the thermal diffusivity κ is small, it becomes more difficult for the heat to escape to the base material at the backside, and thus the optimum thickness Lopt and the upper limit thickness Lmax are reduced. Therefore, as shown in the calculation result of FIG. 8, the optimum thickness Lopt and the upper limit thickness Lmax are reduced as the thermal diffusivity κ is reduced. When the optimum thickness Lopt [μm] of the thermal insulation thin layer 20 is represented as a function of the thermal diffusivity κ [mm²/s] based on the calculation result shown in FIG. 8, the following equation (2) can be obtained. When the upper limit thickness Lmax [μm] of the thermal insulation thin layer 20 is represented as a function of the thermal diffusivity κ [mm²/s], the following equation (3) can be obtained.

$$Lopt = 122 \times (\kappa)^{0.5} \quad (2)$$

$$Lmax = 207.4 \times (\kappa)^{0.5} \quad (3)$$

On the other hand, in the calculation result shown in FIG. 8, the lower limit thickness Lmin of the thermal insulation thin layer 20 changes corresponding to the thermal conductivity λ of the thermal insulation thin layer 20, and the lower limit thickness Lmin is increased as the thermal conductivity λ is increased. Because the heat loss Q_total escaping from the gas in the cylinder to the wall of the combustion chamber over all strokes changes corresponding to the thermal resistance λ/L of the thermal insulation thin layer 20, if the thermal resistance λ/L is considered as an index for heat blockage, in order to achieve a constant thermal resistance λ/L to achieve a constant heat loss Q_total, the thickness L must be increased as the thermal conductivity λ of the thermal insulation thin layer 20 is increased. Because of this, as shown in the calculation result shown in FIG. 8, the lower limit thickness Lmin where Q_total (insulation)/Q_total (no insulation)=0.98 is increased as the thermal conductivity λ is increased. Based on the calculation result shown in FIG. 8, the lower limit thickness Lmin [μm] of the thermal insulation thin layer 20 can be represented in a condition where the thermal resistance λ/L is constant, and can be represented by the following equation (4), as a function of the thermal conductivity λ [W/(m·K)].

$$Lmin = 16.7 \times \lambda \quad (4)$$

As described, the range of the thickness L of the thermal insulation thin layer 20 (lower limit thickness Lmin and upper limit thickness Lmax) where significant thermal efficiency improvement advantage can be obtained while inhibiting occurrence of knocking changes corresponding to the thermal properties of the thermal insulation thin layer 20, such as the thermal conductivity λ and the thermal diffusivity κ. In consideration of this, in the present embodiment, the thickness L [μm] of the thermal insulation thin layer 20 is set within a range where the following equation (5) is satisfied. With such a configuration, the heat loss Q_total escaping from the gas in the cylinder to the wall of the combustion chamber over all strokes can be reduced and the thermal efficiency can be consequently improved while inhibiting degradation of knocking due to an increase in the amount of heating Q_intake of the gas in the cylinder during the intake stroke. Because this advantage can be obtained regardless of the material of the thermal insulation thin layer 20 (thermal properties thereof), a degree of freedom of selection of the material for the thermal insulation thin layer 20 can be improved.

$$16.7 \times \lambda \leq L \leq 207.4 \times (\kappa)^{0.5} \qquad (5)$$

Further, the optimum thickness Lopt of the thermal insulation thin layer 20 where the amount of heating Q_intake of the gas in the cylinder during the intake stroke is minimized (knocking inhibition advantage is maximized) changes corresponding to the thermal diffusivity κ of the thermal insulation thin layer 20. In consideration of this, in the present embodiment, the thickness L [μm] of the thermal insulation thin layer 20 is set such that the following equation (6) is satisfied (or almost satisfied). With such a configuration, the amount of heating Q_intake of the gas in the cylinder during the intake stroke can be reduced to the utmost, the knocking inhibition advantage can be maximized, and the thermal efficiency can be improved.

$$L = 122 \times (\kappa)^{0.5} \qquad (6)$$

Alternatively, the upper limit thickness Lmax of the thermal insulation thin layer 20 may be set at a thickness where the amount of heating Q_intake of the gas in the cylinder during the intake stroke is not increased compared to the case where there is no thermal insulation thin layer 20. In other words, a thickness L of the thermal insulation thin layer 20 where Q_intake (insulation)/Q_intake (no insulation)=1.0, that is, the amount of heat Q_intake transferred from the wall of the combustion chamber to the gas in the cylinder during the intake stroke is equal to the case where there is no thermal insulation thin layer 20, may be set as the upper limit thickness Lmax of the thermal insulation thin layer 20. FIG. 9 shows a result of calculation of the upper limit thickness Lmax [μm] of the thermal insulation thin layer 20 where Q_intake (insulation)/Q_intake (no insulation) =1.0 while the thermal conductivity λ and the thermal diffusivity κ of the thermal insulation thin layer 20 are changed, along with the optimum thickness Lopt [μm] and the lower limit thickness Lmin [μm]. In the calculation result shown in FIG. 9 also, the upper limit thickness Lmax of the thermal insulation thin layer 20 where Q_intake (insulation)/Q_intake (no insulation)=1.0 changes corresponding to the thermal diffusivity κ of the thermal insulation thin layer 20, and the upper limit thickness Lmax is reduced as the thermal diffusivity κ is reduced. When the upper limit thickness Lmax [μm] of the thermal insulation thin layer 20 where Q_intake(insulation)/Q_intake(no insulation)=1.0 is represented as a function of the thermal diffusivity κ [mm²/s] based on the calculation result shown in FIG. 9, the following equation (7) can be obtained.

$$L\max = 146.4 \times (\kappa)^{0.5} \qquad (7)$$

Therefore, in the present embodiment, the thickness L [μm] of the thermal insulation thin layer 20 may be set within a range where the following equation (8) is satisfied. With such a configuration, the increase in the amount of heating Q_intake of the gas in the cylinder during the intake stroke can be inhibited, the occurrence of knocking can be inhibited, the heat loss Q_total escaping from the gas in the cylinder to the wall of the combustion chamber over all strokes can be reduced, and the thermal efficiency can consequently be improved.

$$16.7 \times \lambda \leq L \leq 146.4 \times (\kappa)^{0.5} \qquad (8)$$

As described before, in order to increase the swing range of the wall temperature Twall of the combustion chamber in one cycle while inhibiting the increase of the wall temperature Twall of the combustion chamber during the intake stroke, the thermal conductivity λ and the thermal capacity ρC per unit volume of the thermal insulation thin layer 20 are preferably low. For example, the thermal conductivity λ of the thermal insulation thin layer 20 is preferably less than or equal to 1.5 [W/(m·K)] and the thermal capacity ρC per unit volume of the thermal insulation thin layer 20 is preferably less than or equal to 3000 [kJ/(m³·K)].

Figure 10:
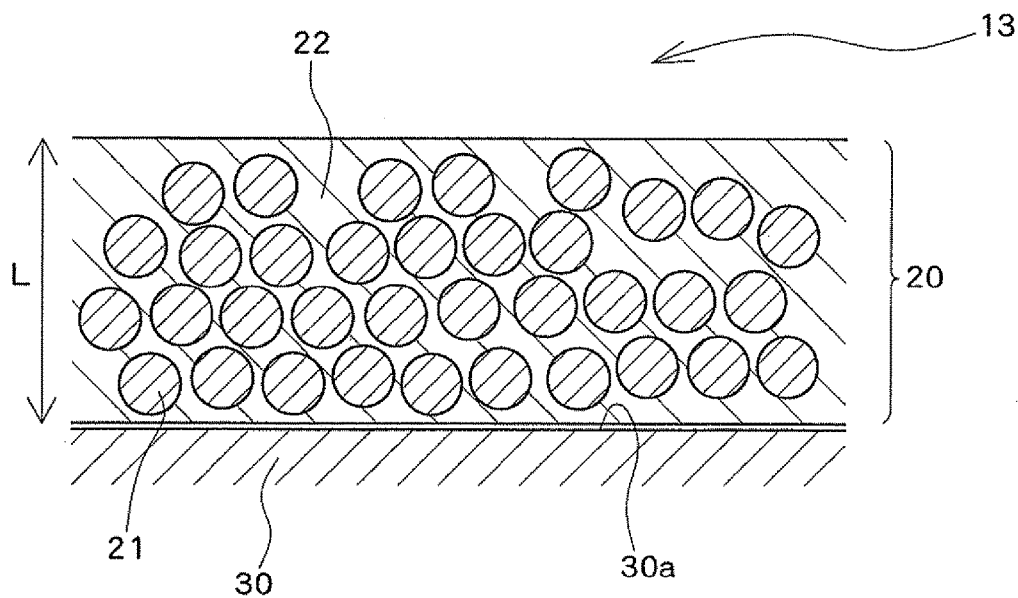
FIG. 10 is a diagram showing an example configuration of the thin layer for thermal insulation.

Next, a specific example structure of the thermal insulation thin layer 20 will be described. FIG. 10 is a cross-sectional diagram showing an example structure of the thermal insulation thin layer 20. In the example structure shown on FIG. 10, the thermal insulation thin layer 20 formed over a wall surface 30a, facing the inside of the combustion chamber 13, of the base material 30 forming the combustion chamber 13, comprises multiple thermal insulation members (first thermal insulation members) 21 formed in the form of particles and a thermal insulation member (second thermal insulation member) 22 formed in the form of a film. The base material 30 described here may be the cylinder block (cylinder liner) 9, the cylinder head 10, the piston 12, the intake valve 16, or the exhaust valve 17. Thus, the wall surface 30a of the base material 30 may be the inner wall surface 9a of the cylinder block (inner wall surface of the cylinder liner), the lower surface 10a of the cylinder head, the piston top surface 12a, the bottom surface 16a of the intake valve, or the bottom surface 17a of the exhaust valve.

The thermal insulation member 22 has a thermal conductivity which is lower than or equal to (or lower than) that of the base material 30, and has a thermal capacity per unit volume which is lower than or approximately equal to that of the base material 30. The thermal insulation member 21 has a lower thermal conductivity and a lower thermal capacity per unit volume than the base material 30, and furthermore, has a lower thermal conductivity and a lower thermal capacity per unit volume than the thermal insulation member 22. The thermal insulation member 22 is coated or joined over the wall surface 30a of the base material 30, and is in contact with the gas in the combustion chamber 13. The thermal insulation member 22 has a heat endurance and pressure endurance for the gas of high temperature and high pressure in the combustion chamber 13, and has a higher heat endurance temperature and a higher strength than the thermal insulation member 21. The multiple thermal insulation members 21, on the other hand, are mixed in the inside of the thermal insulation member 22 and are not in contact with the gas in the combustion chamber 13. The thermal insulation member 22 has, in addition to the function of inhibiting transfer of heat from the gas in the combustion chamber 13 to the base material 30, a function as a protection member for protecting the thermal insulation members 21 from the gas of high temperature and high pressure in the combustion chamber 13. In addition, the thermal insulation member 22 also has a function as an adhesive member connecting the multiple thermal insulation members 21. On the other hand, the thermal insulation members 21 have a function to reduce the thermal conductivity and the thermal capacity per unit volume of the thermal insulation thin layer 20 as a whole. Although not shown in FIG. 10, a thin intermediate member for strengthening the junction or coating of the thermal insulation thin layer 20 (thermal insulation member 22) over the base material 30 may be formed between the thermal insulation thin layer 20 (thermal insulation member 22) and the base material 30. As a method of strengthening the junction or coating of the thermal insulation thin layer 20 over the base material 30, strengthening of the bonding of the materials and prevention of peeling by the thermal shock by setting equal thermal expansion coefficients between the thermal insulation thin layer 20 and the base material 30 may be employed. Therefore, as the intermediate member, an intermediate member for strengthening the bonding between the thermal insulation thin layer 20 and the base material 30, or an intermediate member which reduces a difference in a linear expansion coefficient between the thermal insulation thin layer 20 and the base material 30, is preferably used. Moreover, the intermediate member preferably has a thermal conductivity and a thermal capacity per unit volume similar to those of the thermal insulation members 21 or the thermal insulation member 22. Alternatively, in the thermal insulation thin layer 20, multiple reinforcement members for reinforcing the thermal insulation thin layer 20 and improving the strength, such as a reinforcement fiber member having a high strength and a high heat endurance, may be mixed.

Specific examples of the heat insulation member 22 includes, for example, ceramics such as zirconia ($ZrO_2$), silicon, titanium, and zirconium, organic silicon compounds including carbon, oxygen, and silicon, and high-strength and high-heat endurance ceramic fibers. In addition, binders having inorganic material (ceramic) such as silica (silicon dioxide; $SiO_2$), alumina ($Al_2O_3$), zirconia, silicon carbide (SiC), and silicon nitride ($Si_3N_4$) as a main constituent and ceramic adhesives having the inorganic material as a main constituent may be used for the thermal insulation member 22. Furthermore, a plurality of these materials may be combined for use as the thermal insulation member 22.

Specific examples of the thermal insulation member 21 include, for example, hollow ceramic beads, hollow glass beads, thermal insulation members of a fine porous structure having an inorganic material (ceramic) such as silica and alumina as a main constituent, and silica aerogel or the like. Alternatively, a plurality of these materials may be combined and used for the thermal insulation member 21. With regard to hollow ceramic beads and hollow glass beads, a structure with a reduced pressure inside the shell is preferable because such a structure has a lower thermal conductivity, and because breaking of the beads due to an increase in the pressure inside the shell when the layer temperature is increased can be prevented. In addition, for the hollow ceramic beads, in order to reduce the density of the shell portion, the shell is preferably formed in a porous structure. Specific examples of the base material 30 include, for example, iron (steel), aluminum or aluminum alloy, and ceramics.

The thermal conductivity $\lambda$, the thermal diffusivity $\kappa$, and the thermal capacity $\rho C$ per unit volume of the thermal insulation thin layer 20 as a whole change corresponding to the materials of the thermal insulation members 21 and 22 and the volume ratio between the thermal insulation member 21 and the thermal insulation member 22. As an example, in the thermal insulation thin layer 20 shown in FIG. 10 where the volume ratio of the thermal insulation member 21 is 70%, the volume ratio of the thermal insulation member 22 is 30%, hollow ceramic beads (having a thermal conductivity $\lambda$ of 0.1 [W/(m·K)] and a thermal capacity $\rho C$ per unit volume of 400 [kJ/($m^3$·K)]) are used for the thermal insulation member 21, and a water-glass binder having silica as the main constituent (and having a thermal conductivity $\lambda$ of 1.4 [W/(m·K)] and a thermal capacity $\rho C$ per unit volume of 1600 [kJ/($m^3$·K)]) is used for the thermal insulation member 22, for the overall thermal insulation thin layer 20, the thermal conductivity $\lambda$ is 0.22 [W/(m·K)], the thermal diffusivity $\kappa$ is 0.3 [$mm^2$/s], and the thermal capacity $\rho C$ per unit volume is 750 [kJ/($m^3$·K)]. In this case, the thermal diffusivity $\kappa$ was measured by a laser-flash method, the specific heat C was measured by a differential calorimeter, and the mass and volume were measured to calculate the density $\rho$. In this case, the lower limit thickness Lmin where Q_total (insulation)/Q_total (no insulation)=0.98 is 3.7 [μm], the optimum thickness Lopt where Q_intake is minimized is 66.8 [μm], and the upper limit thickness Lmax where Q_intake (insulation)/Q_intake (no insulation)=1.1 is 113.6 [μm]. Therefore, in this case, the thickness L [μm] of the thermal insulation thin layer 20 is set within a range of greater than or equal to 3.7 [μm] and less than or equal to 113.6 [μm] so that the equation (5) is satisfied. Preferably, the thickness L [μm] of the thermal insulation thin layer 20 is set to be equal to (or almost equal to) 66.8 [μm] so that the equation (6) is satisfied (or almost satisfied). Alternatively, because the upper limit thickness Lmax where Q_intake (insulation)/Q_intake (no insulation)=1.0 is 80.2 [μm], the thickness L [μm] of the thermal insulation thin layer 20 may be set within a range of greater than or equal to 3.7 [μm] and less than or equal to 80.2 [μm] so that the equation (8) is satisfied.

Figure 11:
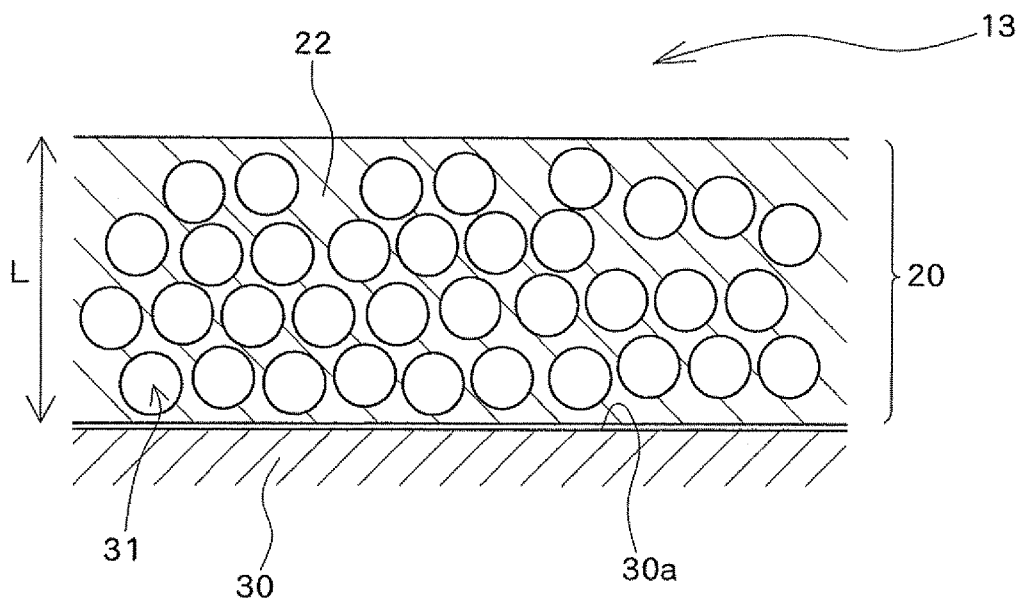
FIG. 11 is a diagram showing another example configuration of the thin layer for thermal insulation.

In the example structure shown in FIG. 10, the thermal insulation members 21 are mixed into the thermal insulation member 22 to form the thermal insulation thin layer 20, but alternatively, multiple bubbles 31 may be formed inside the thermal insulation member 22 in place of the thermal insulation member 21, as shown in FIG. 11. In the example structure of FIG. 11, the thermal insulation thin layer 20 comprises a thermal insulation member 22 (foam thermal insulation member) in which multiple bubbles 31 are formed inside a material having a lower thermal conductivity than the base material 30 and a lower or approximately equal thermal capacity per unit volume as the base material 30. Specific examples of the material forming the thermal insulation member 22 (in which bubbles 31 are formed inside) are similar to the specific examples of the thermal insulation member 22 in the example structure shown in FIG. 10. Alternatively, both multiple thermal insulation members 21 and multiple bubbles 31 may be formed inside the thermal insulation member 22.

As an example, in the thermal insulation thin layer 20 shown in FIG. 11 in which the volume ratio of the bubbles 31 (air) is 80%, the volume ratio of the thermal insulation member 22 is 20%, and a water-glass binder having silica as the main constituent (and having a thermal conductivity $\lambda$ or 2.5 [W/(m·K)] and a thermal capacity $\rho C$ per unit volume of 1600 [kJ/($m^3$·K)]) is used for the thermal insulation member 22, for the overall thermal insulation thin layer 20, the thermal conductivity $\lambda$ is 0.2 [W/(m·K)], the thermal diffusivity $\kappa$ is 0.65 $\mu m^2$ μl, and the thermal capacity $\rho C$ per unit volume is 300 [kJ/($m^3$·K)]. In this case, the thermal diffusivity $\kappa$ was measured by a laser-flash method, the specific heat C was measured by a differential calorimeter, and the mass and volume were measured to calculate the density $\rho$. In this case, the lower limit thickness Lmin where Q_total (insulation)/Q_total (no insulation)=0.98 is 3.3 [μm], the optimum thickness Lopt where Q_intake is minimized is 98.4 [μm], and the upper limit thickness Lmax where Q_intake (insulation)/Q_intake (no insulation)=1.1 is 167.2 [μm]. Therefore, in this case, the thickness L [μm] of the thermal insulation thin layer 20 is set within a range of greater than or equal to 3.3 [μm] and less than or equal to 167.2 [μm] so that the equation (5) is satisfied. Furthermore, the thickness L [μm] of the thermal insulation thin layer 20 is preferably set to be equal to (or almost equal to) 98.4 [μm] so that the equation (6) is satisfied (or almost satisfied). Alternatively, because the upper limit thickness Lmax where Q_intake (insulation)/Q_intake (no insulation)=1.0 is 118 [μm], the thickness L [μm] of the thermal insulation thin layer 20 may be set within a range of greater than or equal to 3.3 [μm] and less than or equal to 118 [μm] so that the equation (8) is satisfied.

Examples of a manufacturing method of the thermal insulation thin layers 20 of the structures shown in FIGS. 10 and 11 include a method of applying and sintering the hollow beads along with the binder and a method of forming a film by foaming and sintering the binder. Alternatively, the use of a surface processing as the film formation method may also be considered. For example, a method may be considered in which nano-size pores are formed on a surface of the base material by an anode oxidation process of aluminum. In this process, for example, a film having a pore ratio of, for example, 10%-50% may be formed in a necessary thickness, so that a similar advantage can be expected.

In addition, for the cylinder block (cylinder liner) 9, the cylinder head 10, the piston 12, the intake valve 16, and the exhaust valve 17, which are base materials forming the combustion chamber 13, because the materials differ from each other, the materials of the thermal insulation thin layers 20 to be formed over the wall surfaces facing the inside of the combustion chamber 13 may differ among these base materials. In this case, the thermal properties of the thermal insulation thin layers 20, such as the thermal conductivity $\lambda$, the thermal diffusivity $\kappa$, and the thermal capacity $\rho C$ per unit volume, would differ among the base materials. When a plurality of types of thermal insulation thin layers 20 having different thermal diffusivities $\kappa$ from each other are to be formed over the wall surfaces, facing the inside of the combustion chamber 13, of the base materials, the range of the thickness L of the thermal insulation thin layer 20 (upper limit thickness Lmax) where knocking is not degraded would differ among the thermal insulation thin layers 20, and the range of the thickness L (upper limit thickness Lmax) moves to the increased side for the thermal insulation thin layer 20 having a higher thermal diffusivity $\kappa$. In addition, the optimum thickness Lopt of the thermal insulation thin layer 20 where the amount of heating Q_intake of the gas in the cylinder during the intake stroke is minimized (where the knocking inhibition advantage is maximized) would differ among the thermal insulation thin layers 20, and the optimum thickness Lopt of the thermal insulation thin layer 20 is increased for the thermal insulation thin layer 20 having a higher thermal diffusivity $\kappa$. Therefore, in this case, the thickness L is set thicker for the thermal insulation thin layer 20 having a higher thermal diffusivity. With such a configuration, in each thermal insulation thin layer 20, the heat loss Q_total escaping from the gas in the cylinder to the wall of the combustion chamber over all strokes can be reduced without inducing the degradation of knocking due to an increase in the amount of heating Q_intake of the gas in the cylinder in the intake stroke, and consequently, the thermal efficiency can be improved. In this process, the thickness L of the thermal insulation thin layer 20 is preferably set to be thicker for the thermal insulation thin layer 20 having a higher thermal diffusivity $\kappa$, so that the equation (5) is satisfied. In addition, the thickness L of the thermal insulation thin layer 20 may alternatively be set thicker for the thermal insulation thin layer 20 having a higher thermal diffusivity $\kappa$, so that the equation (8) is satisfied.

Moreover, based on equation (2), the value of $Lopt/(\kappa)^{0.5}$ is a constant value. Therefore, the thickness L of each thermal insulation thin layer 20 is preferably set based on the thermal diffusivity $\kappa$ such that $L/(\kappa)^{0.5}$ is approximately constant. With such a configuration, in each thermal insulation thin layer 20, the amount of heating Q_intake of the gas in the cylinder during the intake stroke can be reduced to a maximum degree, the knocking inhibition advantage can be maximized, and the heat loss Q_total is escaping from the gas in the cylinder to the wall of the combustion chamber over all strokes can be reduced. In this process, based on equation (2), the thickness L of each thermal insulation thin layer 20 is preferably set based on the thermal diffusivity $\kappa$ such that $L/(\kappa)^{0.5}$ is equal to (or approximately equal to) 122.

Figure 12:
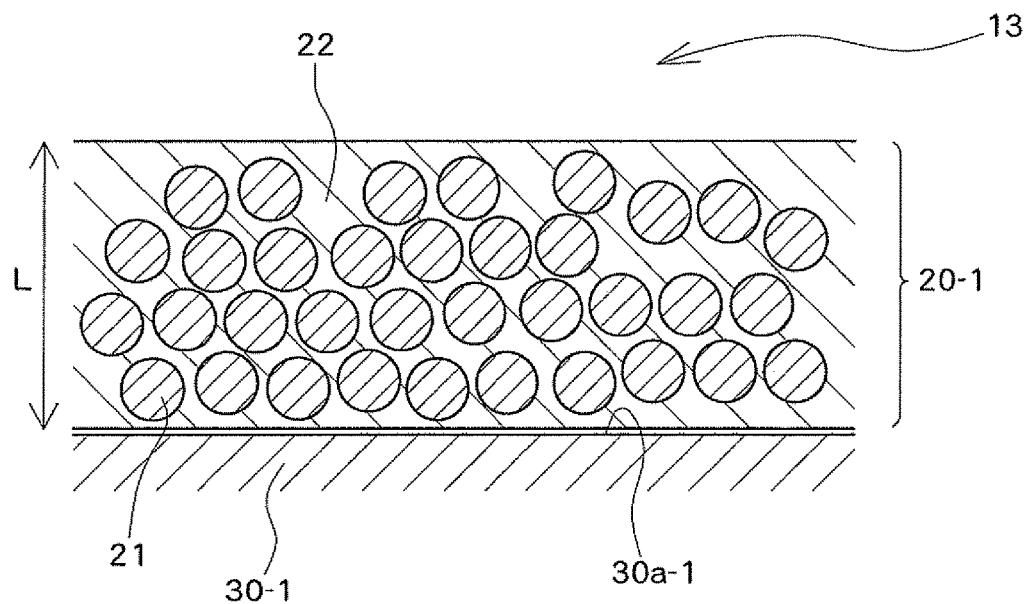
FIG. 12 is a diagram schematically showing another structure of a spark ignition engine according to a preferred embodiment of the present invention.
Figure 13:
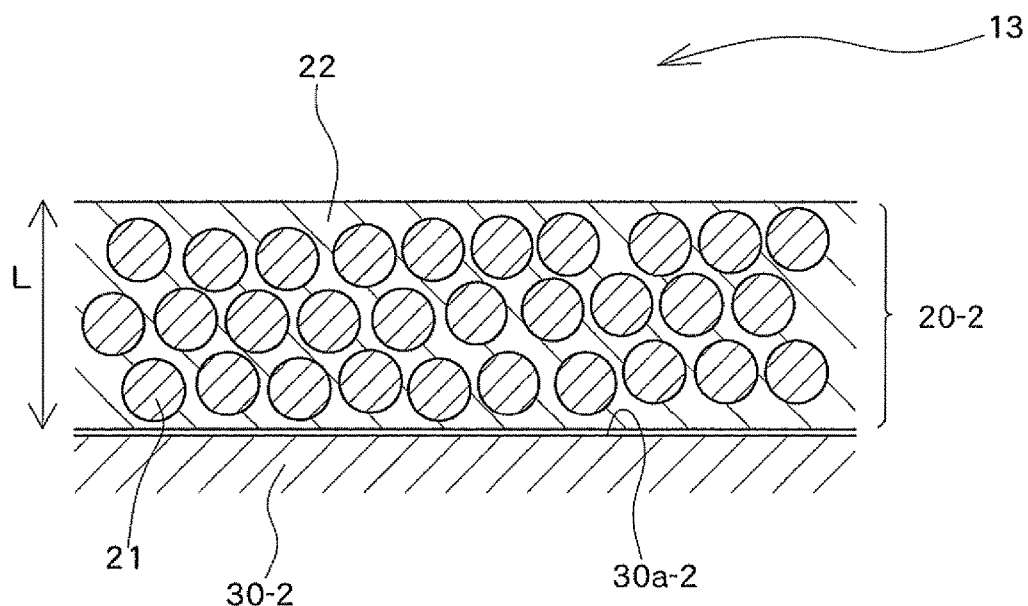
FIG. 13 is a diagram schematically showing another structure of a spark ignition engine according to a preferred embodiment of the present invention.

In example configurations shown in FIGS. 12 and 13, materials of base materials 30-1 and 30-2 forming the combustion chamber 13 differ from each other. A material of a thermal insulation thin layer 20-1 formed over a wall 30a-1 of the base material 30-1 differs from a material of a thermal insulation thin layer 20-2 formed over a wall surface 30a-2 of the base material 30-2, and a thermal diffusivity $\kappa$ of the thermal insulation thin layer 20-1 is higher than the thermal diffusivity $\kappa$ of the thermal insulation thin layer 20-2. In this case, a thickness L of the thermal insulation thin layer 20-1 is set higher than a thickness L of the thermal insulation thin layer 20-2.

A preferred embodiment of the present invention has been described. However, the present invention is not limited to the described embodiment, and various modifications may be made without departing from the spirit and scope of the present invention.

What is claimed is:

1. A spark ignition engine in which a thermal insulation layer is formed over a wall surface, facing an inside of a combustion chamber, of at least a part of base materials forming the combustion chamber, and mixture gas in the combustion chamber is ignited to burn the mixture gas, wherein:

for a thermal conductivity $\lambda$ [W/(m·K)], a thermal diffusivity $\kappa$ [mm²/s], and a thickness L [μm] of the thermal insulation layer, relationships:
(i) $16.7 \times \lambda \leq L \leq 207.4 \times (\kappa)^{0.5}$,
(ii) the thermal conductivity $\lambda \leq 1.5$ [W/(m·K)],
(iii) the thermal diffusivity $\kappa \leq 0.3$ [mm²/s] are satisfied, and the thermal insulation layer comprises:
a first part being a film layer formed of one or more of zirconia, silicon, titanium, and zirconium, organic silicon compounds carbon, oxygen, silicon, high-strength and high-heat endurance ceramic fibers, silica, alumina, silicon carbide, and silicon nitride,
a second part being one or more of hollow ceramic beads, hollow glass beads, fine porous structure having an inorganic material, and silica aerogel,
the second part of the thermal insulation layer is mixed into the first part such that the surfaces of the second part are entirely surrounded by the first part, and
the first part is layered over the wall surface.

2. The spark ignition engine according to claim 1, wherein a relationship:

$$16.7 \times \lambda \leq L \leq 146.4 \times (\kappa)^{0.5}$$

is satisfied.

3. The spark ignition engine according to claim 1, wherein a relationship:

$$L=122\times(\kappa)^{0.5}$$

is satisfied.

4. The spark ignition engine according to claim 1, wherein a relationship for the thermal capacity per unit volume $\rho C \leq 3000$ [kJ/(m$^3$·K)] is satisfied.

5. The spark ignition engine according to claim 1, wherein the thermal insulation layer comprises a mixture of the first part and the second part in which a volume ratio of the first part is different than a volume ratio of the second part in the thermal insulation layer.

\* \* \* \* \*